United States Patent
Scholz et al.

(10) Patent No.: US 7,694,571 B2
(45) Date of Patent: Apr. 13, 2010

(54) PRESSURE TRANSPONDER WITH SURFACE ACOUSTIC WAVE SENSOR

(75) Inventors: Wolfgang Scholz, Minden (DE); Armin Gasch, Speyer (DE); Raiko Milanovic, Frankfurt (DE); Peter Reigler, Goettingen (DE)

(73) Assignee: ABB AG, Mannheim (DE)

( * ) Notice: Subject to any disclaimer, the term of this patent is extended or adjusted under 35 U.S.C. 154(b) by 249 days.

(21) Appl. No.: 11/794,679

(22) PCT Filed: Dec. 23, 2005

(86) PCT No.: PCT/EP2005/014010

§ 371 (c)(1),
(2), (4) Date: Jul. 3, 2007

(87) PCT Pub. No.: WO2006/072420

PCT Pub. Date: Jul. 13, 2006

(65) Prior Publication Data

US 2008/0307889 A1    Dec. 18, 2008

(30) Foreign Application Priority Data

Jan. 8, 2005    (DE)    ........................ 10 2005 001 097

(51) Int. Cl.
    *G01L 11/00*    (2006.01)
(52) U.S. Cl. .......................................... 73/703; 73/570
(58) Field of Classification Search ........... 73/700–756; 310/313 R
    See application file for complete search history.

(56) References Cited

U.S. PATENT DOCUMENTS 4,073,191 A * 2/1978 Saigusa ........................ 73/706
4,534,223 A * 8/1985 Sinha et al. .................... 73/703

(Continued)

FOREIGN PATENT DOCUMENTS

DE    102 55 279 A1    6/2004

(Continued)

OTHER PUBLICATIONS

Bill Drafts, "Acoustic Wave Technology Sensors", IEEE Transactions on Microwave Theory and Techniques, vol. 49, No. 4, Apr. 2001, pp. 795-802 (cited in International Search Report).

(Continued)

*Primary Examiner*—Lisa M Caputo
*Assistant Examiner*—Jermaine Jenkins
(74) *Attorney, Agent, or Firm*—Buchanan Ingersoll & Rooney PC

(57) ABSTRACT

The invention relates to a pressure sensor, the measuring cell of which is provided with at least one membrane for the protection of the pressure-sensitive element and a measuring chamber, filled with pressure medium, in which the pressure-sensitive element is housed. According to the invention, the membrane is monitored for damage, whereby at least one surface wave sensor is arranged in the chamber filled with pressure medium. On damage to the membrane occurring, process medium is mixed with the pressure medium. A substance change in the sensitive region of the surface wave sensor is thus brought about which results in a differing signal run time. Any change in run time is an indictor of damage to the pressure sensor and may be signaled as such.

8 Claims, 1 Drawing Sheet

U.S. PATENT DOCUMENTS

| | | | |
|---|---|---|---|
| 4,578,735 A * | 3/1986 | Knecht et al. | 361/283.4 |
| 4,586,108 A * | 4/1986 | Frick | 361/283.3 |
| 4,586,382 A * | 5/1986 | Sinha | 73/703 |
| 4,665,753 A | 5/1987 | Bertrand | |
| 4,995,266 A * | 2/1991 | Tobita et al. | 73/706 |
| 5,072,190 A | 12/1991 | Martin | |
| 5,128,537 A * | 7/1992 | Halg | 250/231.19 |
| 5,212,989 A * | 5/1993 | Kodama et al. | 73/706 |
| 5,763,784 A * | 6/1998 | Biskup | 73/716 |
| 6,571,638 B2 * | 6/2003 | Hines et al. | 73/702 |
| 6,710,682 B2 * | 3/2004 | Onishi et al. | 333/193 |
| 6,715,355 B2 * | 4/2004 | Vile et al. | 73/702 |
| 6,865,950 B2 * | 3/2005 | Freakes et al. | 73/702 |
| 7,022,282 B2 * | 4/2006 | Takaoka et al. | 420/557 |
| 7,027,921 B2 * | 4/2006 | Kalantar-Zadeh et al. | 702/2 |
| 7,047,792 B1 * | 5/2006 | Bhethanabotla et al. | 73/24.01 |
| 7,165,455 B2 * | 1/2007 | Magee et al. | 73/650 |
| 7,298,067 B1 * | 11/2007 | Kosinski | 310/341 |
| 7,459,828 B2 * | 12/2008 | Cherednick et al. | 310/313 R |
| 2002/0027485 A1 * | 3/2002 | Shin | 333/193 |
| 2003/0137217 A1 * | 7/2003 | Ishibashi et al. | 310/313 R |
| 2006/0254356 A1 * | 11/2006 | Liu et al. | 73/592 |

FOREIGN PATENT DOCUMENTS

| | | |
|---|---|---|
| EP | 0 143 705 A2 | 6/1985 |
| EP | 0 838 672 A1 | 4/1998 |
| GB | 2 065 893 A | 7/1981 |

OTHER PUBLICATIONS

*International Search Report dated Feb. 24, 2006 (with English translation of category of cited documents).

International Preliminary Report on Patentability and English translation of the Written Opinion issued in PCT/EP2005/014010; Aug. 23, 2007; EPO, Geneva, CH.

* cited by examiner

PRESSURE TRANSPONDER WITH SURFACE ACOUSTIC WAVE SENSOR

FIELD

The invention relates to a pressure sensor having at least one membrane for protection of the pressure-sensitive element, according to the features of the preamble of patent claim 1.

BACKGROUND

Pressure sensors such as these are known from prior use and from relevant publications. Their fundamental mechanical design is described in detail in GB 2 065 893 and EP 0 143 702. According to both prior publications, irrespective of the nature of the conversion of mechanical pressure/differential-pressure signals to equivalent electrical variables, an essentially cylindrical central body is provided, which is enclosed between two identical caps, in the form of shells, using a corresponding sealing means. These caps are screwed to one another by means of a plurality of bolts which are arranged radially and are mechanically prestressed, with the mechanical prestressing of the bolts being chosen such that any pressure loss on the central body is avoided when subjected to the maximum permissible static pressure load.

On the central body side, each cap has a recess which is connected to flange connections by channels which are normally in the form of holes. The distance between the centers of these channels is predetermined by standardization on the flange connections.

The measurement mechanism is accommodated in a measurement chamber, which is separated from the process medium on both pressure supply sides by a respective separating membrane. The measurement chamber is filled with an incompressible pressure medium. If the separating membrane is damaged, aggressive process medium enters the measurement chamber, and damages the measurement mechanism. Damage such as this can be identified only with a very great deal of effort—if at all—during normal use.

SUMMARY

The invention is therefore based on the object of specifying means which in a simple manner signal damage to the separating membranes.

According to the invention, this object is achieved by the means in patent claim 1. Advantageous refinements of the invention are described in patent claims 2 to 5.

Against the background of a pressure sensor of this generic type, at least one surface acoustic wave sensor is accommodated in the measurement chamber, which is filled with the pressure medium. The surface acoustic wave sensor essentially comprises a transmitting element, a receiving element and a path located between them. The transmitting element and the receiving element comprise two conductive electrodes which engage in one another like combs, so-called IDTs (interdigital transducers), on an insulating substrate. The path between the transmitting element and the receiving element is the sensitive area of the surface acoustic wave sensor.

The transmitting element is excited with an AC voltage. A mechanical surface acoustic wave is produced by the piezoelectric effect, and propagates in both directions. After a delay time which is dependent on the substance in the sensitive area of the surface acoustic wave sensor, the surface acoustic wave is detected by the receiving element.

During correct use of the undamaged pressure sensor, the sensitive area of the surface acoustic wave sensor is wetted by the pressure medium. If the separating membrane is damaged, process medium is mixed with the pressure medium. This results in a substance change in the sensitive area of the surface acoustic wave sensor, which is evident in a change in the signal delay time between the transmitting element and the receiving element.

Any delay time change can accordingly be signaled as such and as an indication of damage to the pressure sensor.

Furthermore, all types of chemical or physical substance change in the sensitive area of the surface acoustic wave sensor can advantageously be identified, irrespective of their cause and how they come about.

Further details and advantages of the invention will be explained in more detail in the following text using the example of a differential-pressure sensor. In the drawings which are required for this purpose:

DETAILED DESCRIPTION

Figure 1:
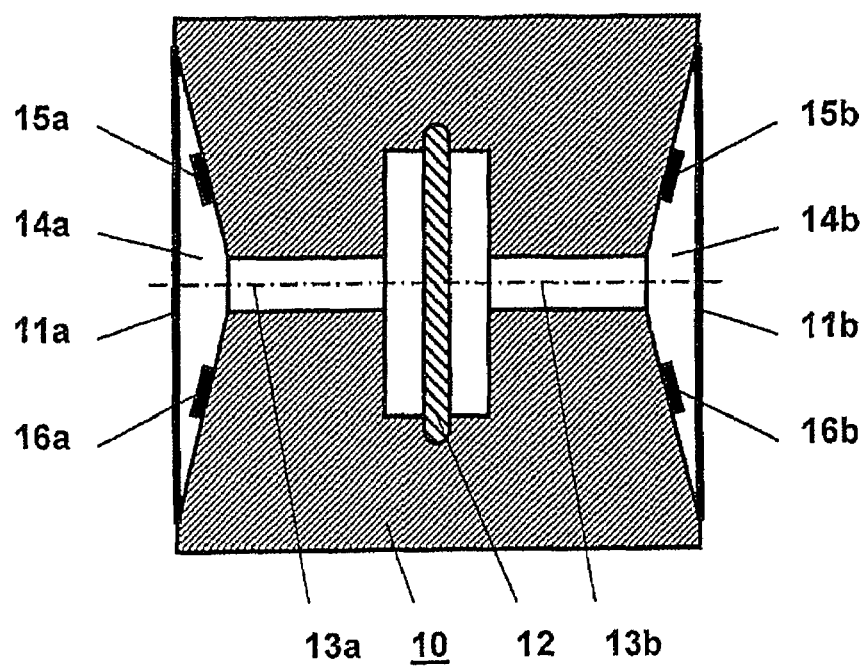
FIG. 1 shows a sectioned illustration of a measurement cell.

FIG. 1 shows a measurement cell 10 of a differential-pressure sensor, illustrated in the form of a section and showing its major elements. Every differential-pressure sensor has two pressure supply sides, whose identical elements are distinguished for this illustration and in the following text by reference symbols with the indices a and b. Each pressure supply side has a measurement chamber 14a and 14b, and these are separated from the process medium by a respective separating membrane 11a and 11b. The measurement chambers 14a and 14b are connected via respective channels 13a and 13b to the two pressure sides of a pressure-sensitive measurement element 12. The respective measurement chambers 14a and 14b and the channels 13a and 13b are filled with an incompressible pressure medium. Silicone oil is normally used as the pressure medium.

At least one surface acoustic wave sensor 15a and 15b is accommodated in each respective measurement chamber 14a and 14b, with the pressure medium flowing around it.

Figure 2:
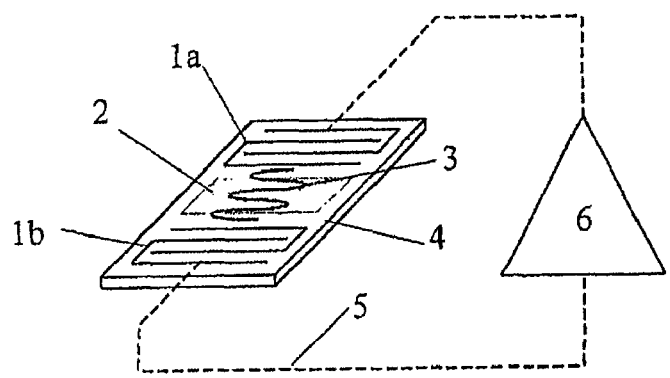
FIG. 2 shows an outline illustration of a sensor device.

The surface acoustic wave sensors 15a and 15b shown in FIG. 2 essentially comprise a transmitting element 1a, a receiving element 1b and a path between them. The transmitting element 1a and the receiving element 1b comprise two conductive electrodes which engage in one another like combs, so-called IDTs (interdigital transducers) on an insulating substrate 4. The path between the transmitting element and the receiving element is the sensitive area 2 of the surface acoustic wave sensor.

The transmitting element 1a is excited with an AC voltage. The piezoelectric effect results in the production of a mechanical surface acoustic wave 3, which propagates in both directions. After a delay time which is dependent on the substrate in the sensitive area 2 of the surface acoustic wave sensor, the surface acoustic wave 3 is detected by the receiving element 1b.

During correct use of the undamaged pressure sensor, the sensitive area 2 of the surface acoustic wave sensor 15a and 15b is wetted with the pressure medium. If the separating membrane 11a or 11b is damaged, process medium is mixed with the pressure medium. This results in a substance change in the sensitive area 2 of the surface acoustic wave sensor 15a or 15b, which is evident in a change in the signal delay time between the transmitting element 1a and the receiving element 1b.

The transmitting element 1a and the receiving element 1b are connected to an amplifier 6 to form a resonant circuit 5.

As soon as the composition of the silicone oil changes, irrespective of whether this is due to a tear in the membrane or by decomposition, other substances are deposited on the sensitive area 2, or the mass composition changes, so that the delay time of the surface acoustic wave 3 changes. The change in the delay time detunes the resonant circuit 5, whose resonant frequency represents the actual measurement signal. The change in the resonant frequency is indicated as a leak in the separating membrane 11a and 11b, with a consequent change in the filling liquid.

This makes it possible to detect not only mixing of silicone oil with the process medium but also loss of the silicone oil and/or its decomposition.

The sensitivity of surface acoustic wave sensors can be estimated as follows. For a $LiTaO_3$ surface acoustic wave element, the literature references quote a mass sensitivity of $S_m=0.043*f^2$ with an operating frequency of 300 MHz. Silicone oil has a density of 924 kg/m³. A concentration change in the region of $10^{-4}$, for example caused by the ingress of water, leads to a frequency change of one Hertz.

In one particular refinement of the invention, surface acoustic wave sensors are used which respond if a threshold value is exceeded. This advantageously simplifies the monitoring of the surface acoustic wave sensors, and limits the amount of data interchanged with the higher-level device.

With reference to FIG. 1, in a further refinement of the invention, a second surface acoustic wave sensor is provided as a reference sensor 16a and 16b in at least one measurement chamber 14a and 14b. The reference sensor 16a and 16b is encapsulated. The temperature-dependent frequency changes of the surface acoustic wave sensors 15a and 15b and of the reference sensors 16a and 16b in the same measurement chamber 14a and 14b are the same. The frequency changes of the surface acoustic wave sensors 15a and 15b and of the reference sensors 16a and 16b are compared. This compensates for the temperature influence on the frequency changes.

Depending on the nature and the thermal characteristics of the material of the measurement cell 10, it is possible to provide for the frequency changes of the surface acoustic wave sensors 15a and 15b to be compared with the reference sensor 16a or 16b. The temperature compensation then advantageously requires only one reference sensor 16a or 16b.

LIST OF REFERENCE SYMBOLS

1a Transmitting element
1b Receiving element
2 Sensitive area
3 Surface acoustic wave
4 Substrate
5 Resonant circuit
6 Amplifier
10 Measurement cell
11a, 11b Separating membrane
12 Measurement element
13a, 13b Channel
14a, 14b Measurement chamber
15a, 15b Surface acoustic wave sensor
16a, 16b Reference sensor

The invention claimed is:

1. A pressure sensor having a pressure-sensitive element and pressure supply sides, each pressure supply side comprising a measurement chamber that includes at least one first surface acoustic wave sensor and a membrane that protects the pressure-sensitive element, wherein the measurement chamber is filled with a pressure medium, such that the at least one first surface acoustic wave sensor is wetted by the pressure medium.

2. The pressure sensor as claimed in claim 1, wherein the first surface acoustic wave sensor has a transmitting element and a receiving element, which are connected to an amplifier to form a resonant circuit.

3. The pressure sensor as claimed in claim 2, wherein the first surface acoustic wave sensor is configured to generate a response based on a threshold-value circuit.

4. The pressure sensor as claimed in claim 1, wherein the first surface acoustic wave sensor is configured to generate a response based on a threshold-value.

5. The pressure sensor as claimed in claim 4, wherein a second surface acoustic wave sensor is arranged in each measurement chamber and is associated with the at least one first surface acoustic wave sensor, which is wetted by the pressure medium, of the same measurement chamber.

6. The pressure sensor as claimed in claim 4, wherein a second surface acoustic wave sensor is arranged in a measurement chamber and is associated with the at least one first surface acoustic wave sensors which are wetted by the pressure medium.

7. The pressure sensor as claimed in claim 1, wherein a second surface acoustic wave sensor is arranged in each measurement chamber and is associated with the first surface acoustic wave sensor, which is wetted by the pressure medium, of the same measurement chamber.

8. The pressure sensor as claimed in claim 1, wherein a second surface acoustic wave sensor is arranged in the measurement chamber and is associated with the at least one first surface acoustic wave sensors which are wetted by the pressure medium.

* * * * *